No. 888,066. PATENTED MAY 19, 1908.
A. COHENCIUS.
SALT SHAKER.
APPLICATION FILED AUG. 6, 1907.
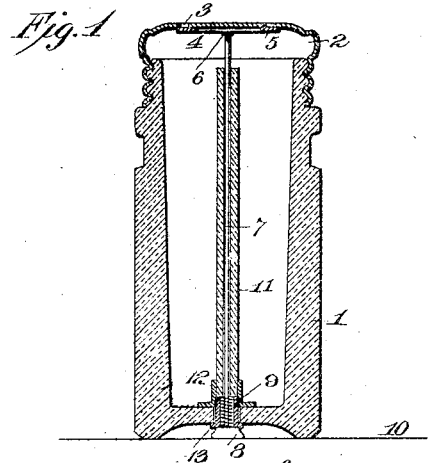
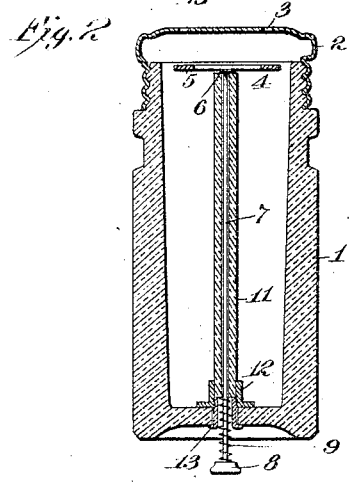
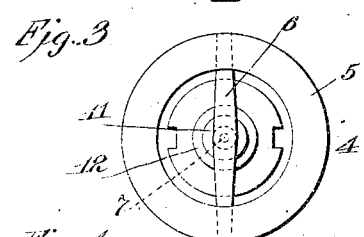
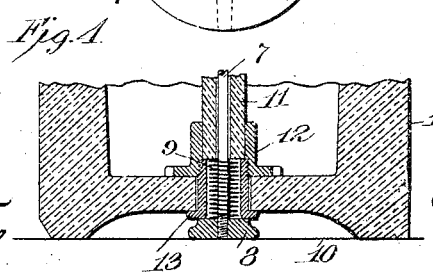
Witnesses:
Jas. F. Coleman
John Polach
Inventor
Abraham Cohencius
By Dyer & Dyer
Attorneys.

UNITED STATES PATENT OFFICE.

ABRAHAM COHENCIUS, OF NEW YORK, N. Y.

SALT-SHAKER.

No. 888,066.  Specification of Letters Patent.  Patented May 19, 1908.

Application filed August 6, 1907. Serial No. 387,255.

*To all whom it may concern:*

Be it known that I, ABRAHAM COHENCIUS, a citizen of the United States, and a resident of the borough of Manhattan, city, county, and State of New York, have invented an Improvement in Salt-Shakers, of which the following is a specification.

The object I have in view is the production of a device for holding salt, pepper, sugar or other comestible or other material in pulverized or powdered form, and which has openings through which the material is shaken out, there being means to prevent the entrance of moisture and dust and the escape of the aromatic or other desirable properties of the contents, such openings being closed by mechanism which automatically opens them when the shaker is used and closes them when not in use. I attain this object by the device illustrated in the accompanying drawings, in which Figure 1 is a vertical section of a salt shaker showing the valve closed. Fig. 2 is a similar view with the valve open. Fig. 3 is an enlarged top plan view of the operating parts; and Fig. 4 is a detail sectional view, on an enlarged scale, of the lower portion of the operating mechanism.

In all of the views like parts are designated by the same reference characters.

I disclose my invention as embodied in a salt shaker, but it is to be understood that it may be used in connection with any device containing granulated or pulverized material which is to be shaken through a perforated wall of the device.

My invention may be used in connection with devices for containing flour, sugar and various granulated and powdered materials used in the arts and sciences.

In the drawings the body 1 of the shaker is shown of the usual form and is made of glass, although any form may be used and any material may be employed. The cover 2 is made of any suitable material, such as metal or celluloid, and is provided with the openings or perforations 3, whereby a wall of the body will contain discharge openings. The cover 2 is shown as secured to the body by screw-threads so that it may be removed, but it is not essential to make it so removable, or if it is desired, it may be attached to the body in a different manner from that shown. The perforations 3 are arranged in annular form in the cover 2, but the arrangement may be varied if desired.

The perforations are adapted to be automatically closed by means of a valve 4, which is adapted by means of mechanism which will be described, to automatically close the perforations when the device is not in use, and automatically open them when the device is being used. The valve is shown in the form of an annular member 5, of proper size, to close all of the perforations in the cover. Connected to the annular member is a cross member 6. This cross member is shown as arranged with its extremities connected to the lower face of the annular member 5. This is for the purpose of permitting close contact of the annular member with the cover even if the center of the latter is depressed, as is the case in many designs of salt shakers.

The valve is carried upon a rod 7, which is shown as extending throughout the length of the body 1 and through an opening in the bottom of the latter, the lower end being secured to a button 8. A spring 9 engaging between the button and the body 1 tends to open the valve; that is, to move it in such position that the perforations 3 are uncovered. The length of the rod 7 is such that when the shaker is not in use and is resting upon its support 10, the engagement of the button with such support will raise the valve and close it; that is, will close the perforations 3, by the engagement of the annular member of the valve with the lower side of the cover.

For the purpose of preventing escape of the contents of the body through the opening, through which passes the rod 7, and also for the purpose of guiding such rod and limiting the extent of movement of the valve, I provide a tube 11 within the body and surrounding the rod. This tube is shown as made of glass so as not to be acted upon by the contents of the shaker, but the material of which it is made is unessential. It is also shown as being made separate from the body, but it is not necessary that it be so made. The means for connecting it to the body, as shown, consist of a collar 12, which closely engages with the lower end of the tube 11, and is provided with a flange which engages with the inside of the bottom of the body. The tube extends part way into the collar, the rest of the length of the collar being occupied by the upper end of a hollow washer 13, such washer being threaded to engage with the collar and serving to tightly clamp the collar against the inside of the bottom of the body and produce a tight joint therewith. The collar, and if desired, the washer also are best made of a non-corrosive metal. The periphery of the collar is provided with notches, as shown, for the application of a tool for attachment to the hollow washer. The button 8 is best made in the form of a nut screwed upon the lower end of the rod. The spring, as shown in Fig. 4, when the device is resting upon its support, lies within the hollow washer, one end bearing against the button and the other against the lower end of the tube.

It will be apparent that in my device the perforations are in a wall of the body, and are closed when the device is out of use, and are automatically opened when the device is in use, by the mere lifting up of the shaker, or the reversing it so as to permit the discharge of its contents.

The details of construction described may be varied within wide limits, such details being disclosed for the purpose of illustration.

While I claim my invention as applied to a salt shaker, I desire it understood that by "salt shaker" I mean any device of the same general class which will include pepper shakers, sugar and flour dusters, as well as all devices for shaking or dusting powdered or granulated material for every purpose.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. A salt shaker having a body and a perforated cover, a valve within the body engaging with the perforation the said valve moving in a line toward and away from the cover, a spring for disengaging the valve from the perforation, and means actuated by the engagement of the body with its support for closing the valve.

2. A salt shaker having a body and a perforated cover, with a valve within the body, the said valve moving toward and away from the cover to close and open the perforation, operating means for the valve, such means extending through an opening in the body, and adapted to engage with the support, and means actuated by the removal of the body from its support for opening the valve.

3. A salt shaker which comprises a glass body with a removable perforated cover, a valve within the body mounted to move toward and away from the cover to close and open the perforation therein, a stem on which the valve is mounted extending through a glass tube lying within the body, the connection between the body and tube comprising a collar which lies within the body and engages with the tube, and a hollow washer which passes through an opening in the body and engages with the collar, the stem of the valve passing through the hollow washer and carrying a button on its other end, there being a spring between the button and the tube surrounding the stem and lying within the hollow washer.

4. A salt shaker which comprises a glass body, a removable perforated cover, a tube within the body extending from the bottom to a point below the cover, a valve within the body mounted to move toward and away from the cover to close and open the perforation therein, a stem on which the valve is mounted passing through the tube, the tube being adapted to engage with the valve when open, and limiting the extent of opening of the valve, the free end of the stem extending through the bottom of the body, a button on the stem, and a spring surrounding the stem, and adapted to exert stress in the direction to open the valve and cause it to engage with the free end of the tube, said stem and button, when the valve is fully open, extending below the bottom of the body a distance equal to that between the top of the tube and the underside of the cover.

This specification signed and witnessed this second day of August, 1907.

ABRAHAM COHENCIUS.

Witnesses:
LEONARD H. DYER,
JOHN L. LOTSCH.